United States Patent
Eberstadt, III

(10) Patent No.: US 10,059,406 B1
(45) Date of Patent: Aug. 28, 2018

(54) MARINE DRAIN VALVE

(71) Applicant: Rudolph Eberstadt, III, Norwalk, CT (US)

(72) Inventor: Rudolph Eberstadt, III, Norwalk, CT (US)

(*) Notice: Subject to any disclaimer, the term of this patent is extended or adjusted under 35 U.S.C. 154(b) by 0 days.

(21) Appl. No.: 15/603,750

(22) Filed: May 24, 2017

(51) Int. Cl.
*B63B 13/00* (2006.01)

(52) U.S. Cl.
CPC .................... *B63B 13/00* (2013.01)

(58) Field of Classification Search
CPC ........................................ B63B 13/00
USPC ........................................ 114/183 R
See application file for complete search history.

(56) References Cited

U.S. PATENT DOCUMENTS

| | | | | |
|---|---|---|---|---|
| 2,997,975 A * | 8/1961 | Moeller | ............... | B63B 13/00 114/183 R |
| 3,757,726 A * | 9/1973 | Moeller | ............... | B63B 13/00 114/183 R |
| 3,812,810 A * | 5/1974 | Moeller | ............... | B63B 13/00 114/197 |
| 4,516,515 A * | 5/1985 | Johnson | ............... | B63B 13/00 114/197 |
| 4,932,348 A * | 6/1990 | Nix | ............... | B63B 13/00 114/183 R |
| 4,986,777 A * | 1/1991 | Preston | ............... | F01M 11/0408 114/197 |
| 5,162,793 A * | 11/1992 | Plost | ............... | B63B 13/00 114/197 |
| 5,724,908 A * | 3/1998 | Murray | ............... | B63B 13/00 114/197 |
| 5,950,987 A * | 9/1999 | Kaneko | ............... | F16K 1/2028 251/303 |
| 6,038,992 A * | 3/2000 | Smith | ............... | B63B 13/00 114/183 R |
| 6,050,867 A * | 4/2000 | Shields | ............... | B63B 13/02 114/183 R |
| 6,338,309 B1 * | 1/2002 | Michelson | ............... | B63B 13/00 114/183 R |
| 6,357,376 B1 * | 3/2002 | Purio | ............... | B63B 13/00 114/183 R |
| 6,390,007 B1 * | 5/2002 | Walker | ............... | B63B 13/00 114/183 R |
| 6,477,971 B2 * | 11/2002 | Green | ............... | B07C 5/342 114/183 R |

(Continued)

OTHER PUBLICATIONS

2016 Moeller Marine Products Catalog, available at http://moellermarine.com/customer-resources/catalog/, pp. 69-72.

*Primary Examiner* — S. Joseph Morano
*Assistant Examiner* — Jovon Hayes
(74) *Attorney, Agent, or Firm* — Gordon & Jacobson, P.C.

(57) ABSTRACT

A valve for use with a vessel drain tube includes a body extending along a longitudinal axis. The body has an outer surface and an inner surface defining a bore extending longitudinally from a first end to a second end. The valve includes an external seal on the outer surface of the body for sealing with the drain tube, at least one internal seal on the inner surface extending into the bore, a retaining member extending at least partially into the bore and being spaced from the internal seal, and a sealing member displaceable between the internal seal and the retaining member. The sealing member is configured to seal with the internal seal in a valve closed, first configuration and to not seal with the internal seal in a valve open, second configuration.

16 Claims, 7 Drawing Sheets

(56) References Cited

U.S. PATENT DOCUMENTS

| | | | | |
|---|---|---|---|---|
| 6,736,081 B1* | 5/2004 | Green | ............ | B63B 13/02 |
| | | | | 114/183 R |
| 6,875,070 B2* | 4/2005 | Nakajima | ............ | F01P 11/0276 |
| | | | | 440/88 N |
| 7,140,316 B2* | 11/2006 | McIntire | ............ | B63B 13/00 |
| | | | | 114/183 R |
| 7,434,528 B1* | 10/2008 | McKibben | ............ | B63B 13/00 |
| | | | | 114/197 |
| 8,146,951 B2* | 4/2012 | Tung | ............ | B63J 4/006 |
| | | | | 114/182 |
| 8,256,365 B2* | 9/2012 | Wise | ............ | B63B 13/00 |
| | | | | 114/197 |
| 9,079,637 B2* | 7/2015 | Sarnowski | ............ | B63B 13/02 |
| 9,527,567 B1* | 12/2016 | Loftin | ............ | F16K 5/04 |
| 2006/0260525 A1* | 11/2006 | Dehart | ............ | B63B 13/00 |
| | | | | 114/197 |
| 2009/0050043 A1* | 2/2009 | Alvarez | ............ | B63B 13/00 |
| | | | | 114/197 |

* cited by examiner

MARINE DRAIN VALVE

BACKGROUND

1. Field

The present application relates to boats and watercraft and, more particularly, to a drain valve for draining water from interior compartments of boats and watercraft.

2. State of the Art

During operation of boats and other watercraft, water can accumulate in interior compartments of the boat. Further, boat operators will often clean these interior compartments with water (or other fluid) which can also result in accumulations of water (or other fluid) within the interior compartments of the boat. Consequently, drains and drain plugs are often installed in the interior compartments of boats so that water accumulated therein can be drained outside of the boat.

For example, in a typical boat, a drain tube is used to drain water from the passenger compartment through the bottom or hull of the boat to the exterior of the boat. The drain tube generally consists of a cylindrical brass or aluminum tube 1 (See FIG. 1A) extending fully across the thickness of the bottom of the hull and having rolled flanges 1a at opposite ends of the tube, which retain the tube in the hull and sealed therewith. The tube 1 can be plugged with a bailer plug 2 or 3 (FIGS. 1B and 1C) to prevent water from entering the interior compartment of the boat when the boat is operating in the water. Usually, the drain tubes 1 are fitted to the boats as original equipment and are present on the boat before delivery to an end user. Examples of bailer plugs are "Snap-Tite", "Turn-Tite", and "Trail-n-Bail" plugs supplied by Moeller Marine Products of Sparta, Tenn. Bailer plugs 2 and 3 are typically radially expandable so that they can fit and seal a range of drain pipe diameters, such as 1 to 1.25 inch diameter. When the boat is out of the water, as shown in FIG. 2, a user can drain water from the interior compartment of the boat by removing the plug 3, as shown in FIG. 3, so that the water in the passenger compartment drains through the open drain tube 1.

One problem associated with drain assemblies of the prior art is that the boat operator may forget to replace the plug after draining the water out of the interior compartment of the boat prior to returning the boat back into the water. For example, it is common for boat operators to open the drains after the boat has been placed on the trailer to allow the water to drain out of the interior compartments after the boat has been removed from the water. If the boat operator forgets to replace the plug, water can then enter the interior compartments of the boat the next time the boat is positioned in the water. In fact, water can enter through the drain in sufficient quantities that the boat can sink.

One solution to this problem is a one-way drain assembly that incorporates a flapper valve. This device includes an aperture that extends through a wall of the boat wherein a valve member is mounted within the aperture in a pivoting fashion. Preferably, the valve member can only pivot so as to open the aperture in response to water flowing from the boat compartment to the exterior of the boat. Further, the valve member is configured so that when water is flowing from the exterior of the boat into the interior of the boat, the valve member closes off the aperture and prevents the water from entering the boat.

While the flapper type drain valve reduces the likelihood of water entering the interior compartments of the boat after the boat operator has failed to reinstall a plug, these devices suffer from some problems. In particular, these devices are typically made of a plastic that degrades as a result of exposure to UV light. Consequently, sunlight often damages these devices to a point where the valve member breaks and does not close off the aperture when needed. Further, these devices are also exposed to oil and other foreign matter within the water which inhibits the correct pivoting motion of the flapper valve member to the point where the valve member does not adequately seal the boat. For example, the foreign matter may cause the flapper to get stuck in a fixed position which either inhibits proper operation of the drain or allows water to flow through the drain into the boat.

Hence, even though the flapper-type drain valves represent an improvement over the standard drains that simply incorporate a plug, it still suffers from serious shortcomings in its ability to prevent water from entering interior compartments of the boat when the boat is positioned in a body of water.

Also, U.S. Pat. No. 6,357,376 describes a boat drain assembly that can be positioned within an opening in a wall of a boat. The assembly includes a member adapted to be positioned within the opening. The member has an upper end that is positioned substantially flush with an inner surface of the boat wall and defines an interior opening that extends across substantially the entire opening in the boat wall and is adapted for water to flow from an interior compartment of the boat to a central passageway defined by the member. The central passageway extends through the wall of the boat when the member is positioned in the opening. The central passageway includes a reduced aperture portion that has a cross sectional area which is less than the cross sectional area of the central passageway.

The assembly also includes a ball that is positioned within the central passageway and is captured therein so as to be positioned adjacent the reduced aperture and retained within the central passageway within the wall of the boat. The ball floats in the central passageway when water is flowing through the reduced aperture from the interior compartment of the boat to the exterior of the boat and wherein the ball is urged into the reduced aperture when water is urged to flow from the exterior of the boat into the interior compartment to thereby inhibit the flow of water from the exterior of the boat into the interior of the boat through the central passageway.

However, the valve assembly in U.S. Pat. No. 6,357,376 requires that a user drill a hole through the wall of the boat for the valve assembly to be received in and requires that the length of the valve assembly be at least as long as the thickness of the wall of the boat. Otherwise, if the length of the central passageway did not extend fully across the thickness of the wall of the boat, it would be possible in the case of hollow wall boats that water could fill the hollow wall of the boat rather than pass through the wall via the valve assembly. Moreover, due to the variation in the thickness of boat hulls among different boats as well as variations in thicknesses of boat hulls throughout the same boat, the length of the valve assembly cannot be standardized. Also, screws are needed to secure the valve assembly to the wall of the boat, requiring the user to drill yet more holes in the boat, which may cause stress cracks and leaks in the wall of the boat.

Thus, there is a need for an improved drain valve for marine vessels.

SUMMARY

According to one aspect, further details of which are provided herein, a marine drain valve for use with a marine drain tube that extends through a wall of a marine vessel includes a body extending along a central axis. The body has a cylindrical outer surface and has a cylindrical inner surface defining a bore extending longitudinally through the body from a first end of the body that is configured to be positioned in an interior compartment of the vessel, to a second end of the body that is configured to be positioned in the drain tube. The body has a length that is less than a length of the drain tube, and the elongated body is configured for placement partly within the drain tube.

The valve also includes at least one external seal extending from the cylindrical outer surface of the body, at least one internal seal extending from the inner cylindrical surface into the bore, a sealing member disposed within the bore, and a retaining member retaining the sealing member in the bore between the at least one internal seal and the retaining member. The sealing member is longitudinally displaceable in the bore between the at least one internal seal and the retaining member and is configured to seal with the at least one internal seal in a first configuration in which the valve is closed and is configured to not seal with the at least one internal seal in a second configuration in which the valve is open.

In one embodiment the outer cylindrical surface defines at least one circumferential groove and the at least one external seal includes an o-ring that is seated in a corresponding circumferential groove. The inner cylindrical surface may define at least one circumferential groove and the at least one internal seal includes an o-ring that is seated in a corresponding circumferential groove. The outer cylindrical surface may define a plurality of circumferential grooves spaced longitudinally from each other, and each circumferential groove may have an inner diameter different from each other. Also, the inner diameters may increase in the axial direction from the second end to the first end. The outer diameters of the o-ring seals seated in the corresponding circumferential grooves increase in the axial direction from the second end to the first end.

In one embodiment, the sealing member is a buoyant member. The sealing member may be a ball or sphere. In one embodiment, the sealing member is retained in the bore between the at least one internal seal and the retaining member. In one embodiment, the retaining member extends diametrically across the bore.

In one embodiment, the body may have an upper portion and a lower portion. The upper portion may be formed as a flange having an outer diameter larger than an outer diameter of the lower portion. The valve may also include a handle coupled to the upper portion of the body.

According to another aspect, further details of which are described herein, a method of installing a marine drain valve in a marine drain tube that extends through a wall of a marine vessel includes providing an afore-mentioned drain valve and introducing the second end of the body of the valve into the drain pipe and sealing the at least one external seal with the drain pipe and positioning the first end of the body in an interior compartment of the vessel.

DETAILED DESCRIPTION

Figure 4:
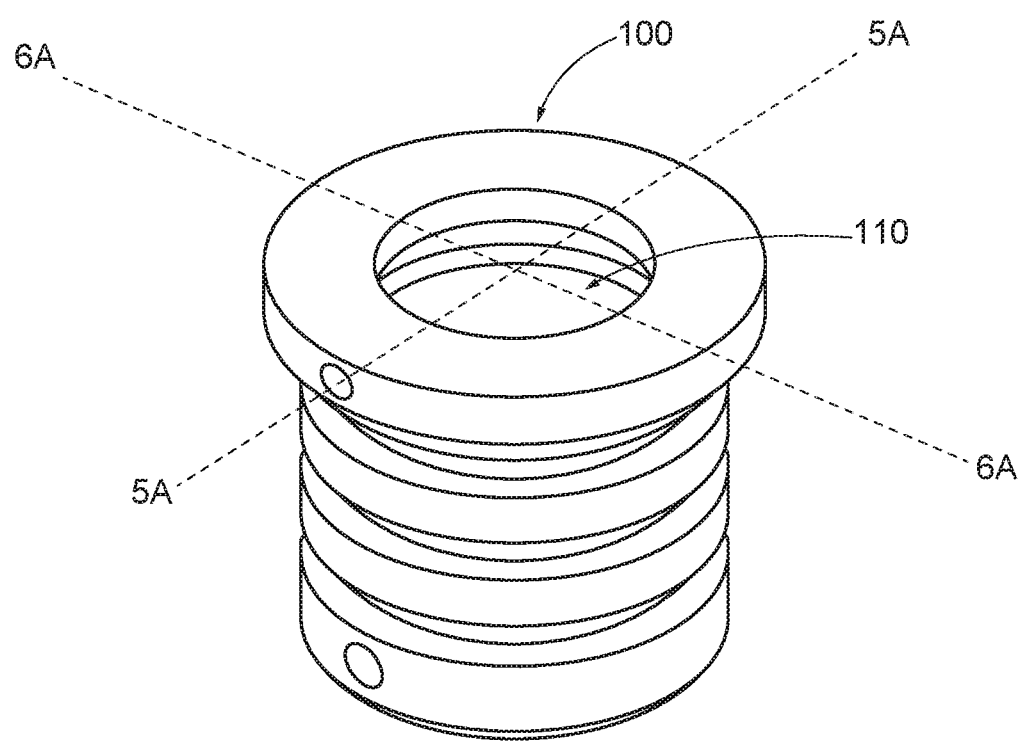
FIG. 4 shows an isometric view of a drain valve with internal and external seals of the valve omitted.

FIG. 4 shows an embodiment of a drain valve 100, shown with internal and external seals omitted, in accordance with the disclosure. The valve 100 is configured to substitute for the aforementioned prior art bailer drain plugs 2 and 3 that fit into dedicated drain tubes 1 that are manufactured into boats. Thus, the valve 100 described herein may simply be used in the drain tube 1 in the place of prior art bailer drain plugs 2 or 3 without requiring a user to drill any new holes in the boat for placement of the valve 100.

Figure 1A:
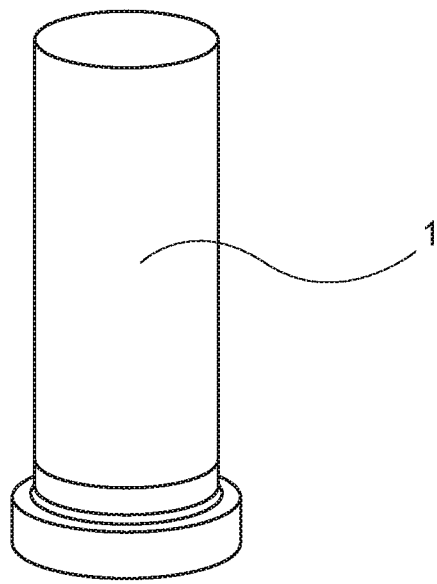
FIG. 1A shows a prior art marine drain tube.
Figure 5A:
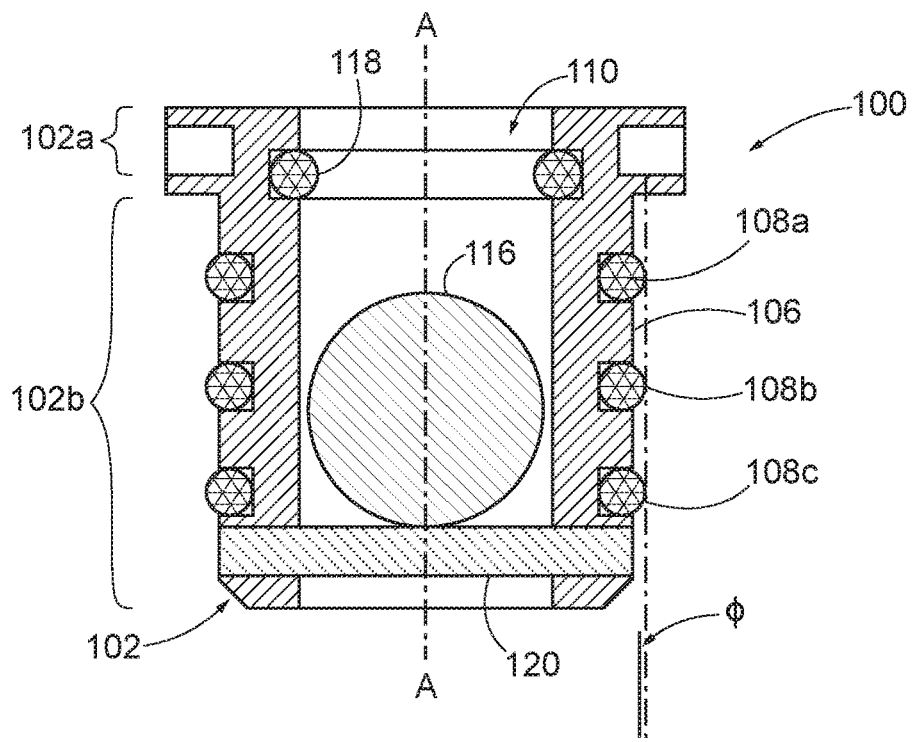
FIG. 5A shows a view of the valve, including the valve body of FIG. 4 along section 5A-5A, shown with internal and external seals. The valve is shown in a valve open configuration.
Figure 5B:
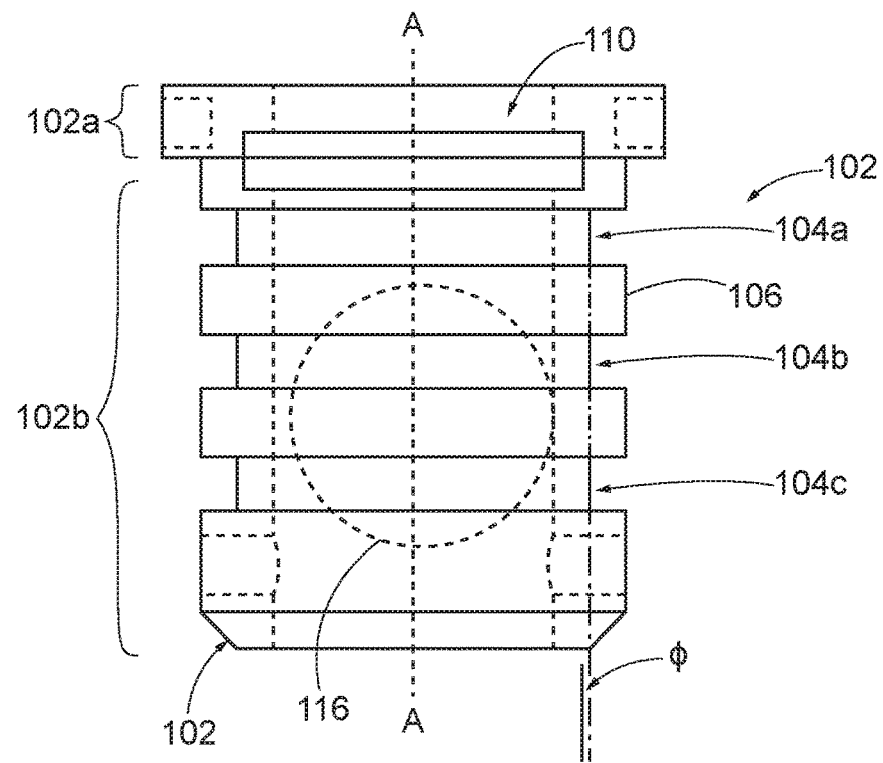
FIG. 5B shows a side elevation view of the body of the valve of FIG. 4. The valve is shown in a valve open configuration.
Figure 5C:
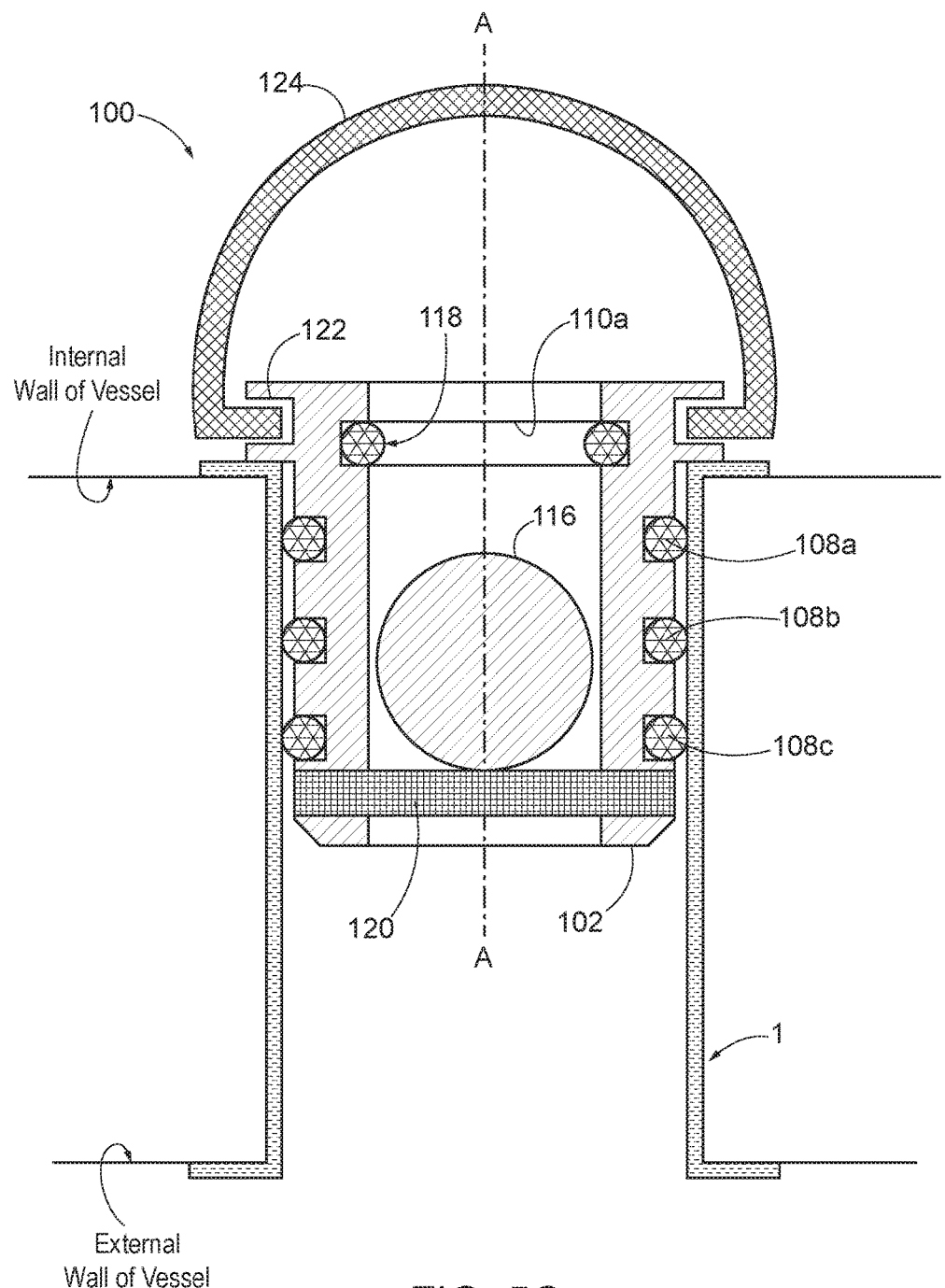
FIG. 5C shows the valve of FIG. 5A in a seated and fully installed configuration in a drain tube of a marine vessel.
Figure 6A:
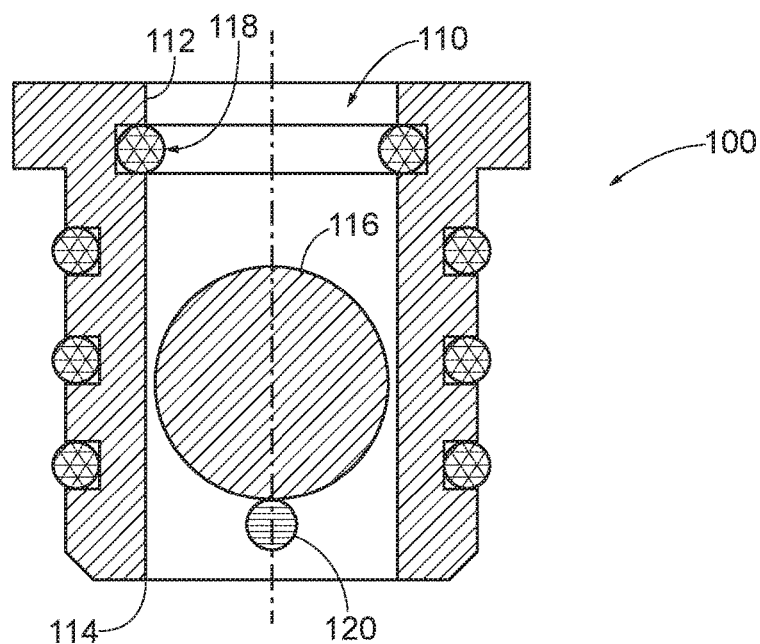
FIG. 6A shows a view of the valve, including the valve body of FIG. 4 along section 6A-6A, shown with internal and external seals. The valve is shown in a valve open configuration.
Figure 6B:
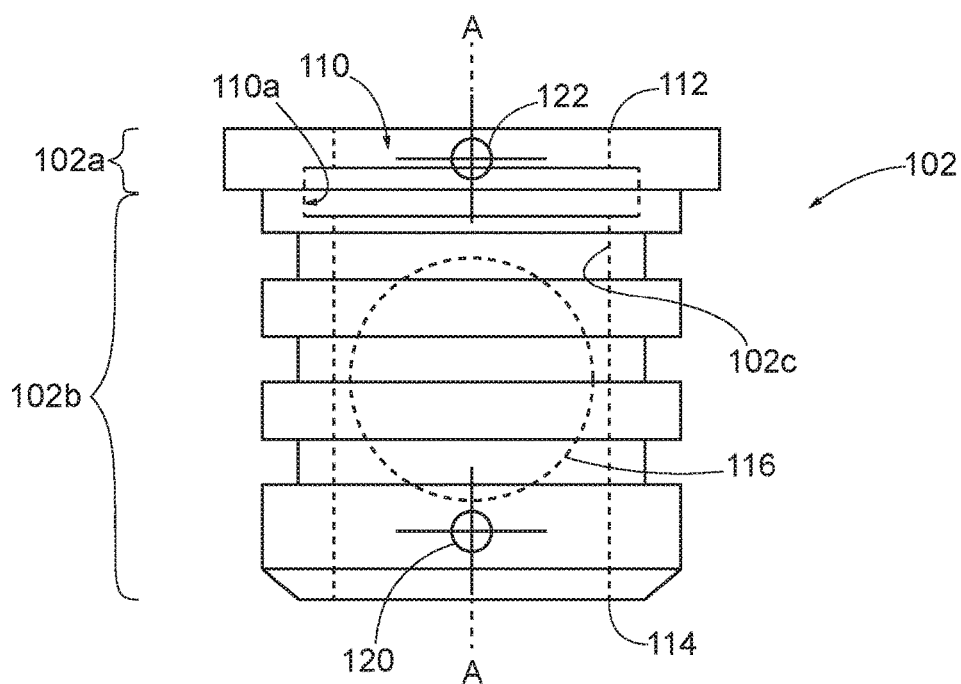
FIG. 6B shows a side elevation view of the body of FIG. 4 rotated ninety degrees from the view of FIG. 5B. The valve is shown in a valve open configuration.
Figure 7:
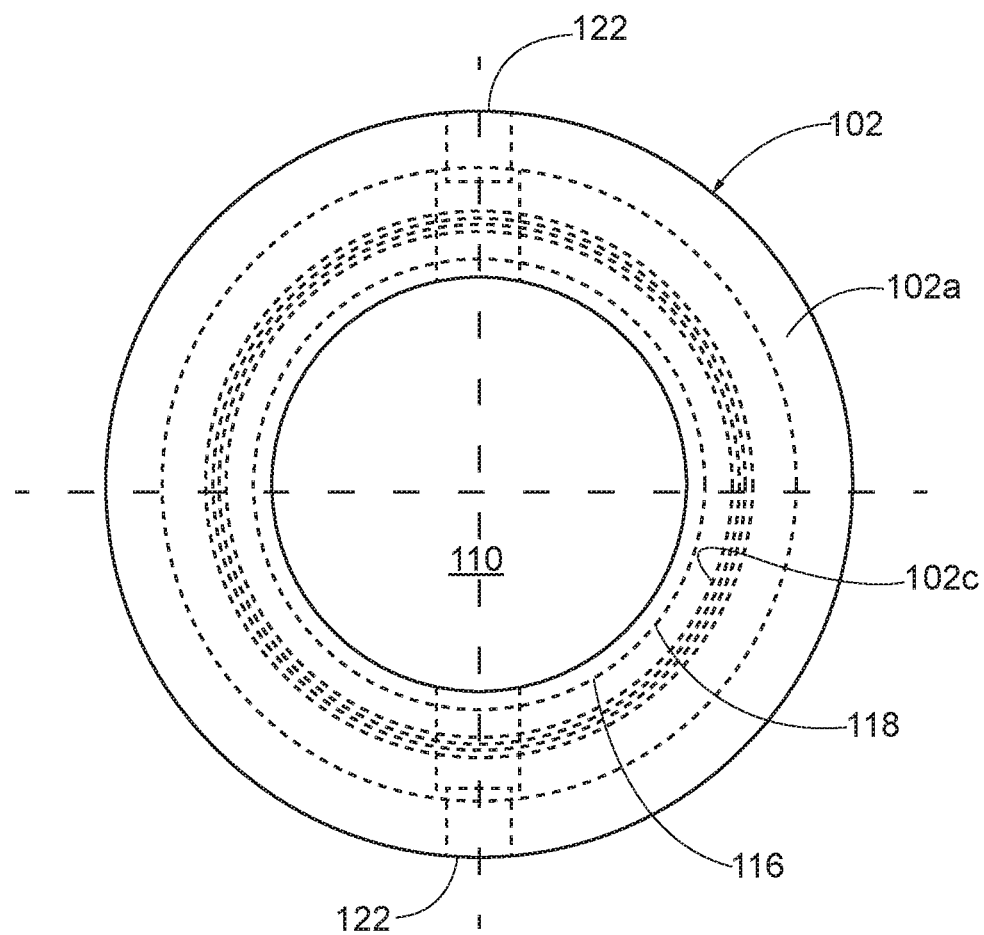
FIG. 7 shows a top plan view of the body shown in FIG. 4.

The valve 100 includes a body 102, shown in greater detail in FIGS. 5B, 6B, and 7B, which is configured generally as a plug to be received in the drain tube 1 in one configuration, such as the drain tube 1 shown in FIG. 1A. In a configuration where the body 102 is seated in the drain tube, a leaktight seal is formed between the valve 100 and the drain tube 1 so that fluid may only pass selectively through a bore 110 (FIGS. 4 to 7) of the body 102, as described in greater detail herein.

Turning to FIGS. 5A and 5B, the body 102 has an upper portion 102a and a lower portion 102b. The lower portion 102b of the valve 100 is configured to be received in and seal with an inner wall of the drain tube when the valve 100 is seated in the drain tube. The upper portion 102a is formed as a flange that is configured to either remain spaced from or engage the rolled flange 1a of the drain tube 1 in the configuration where the valve 100 is fully seated in the drain tube 1, as shown in FIG. 5C. Thus, the upper portion 102a acts as a positive stop limiting how far down into the drain tube the valve 100 can be located by a user.

The lower portion 102b of the body 102 has an outer cylindrical surface 106 that defines one or more circumferential grooves 104a, 104b, and 104c (FIG. 5B) that receive o-ring seals 108a, 108b, and 108c (FIG. 5A). In one embodiment, the thickness (measured in the axial direction A-A in FIG. 5B) of each circumferential groove is 0.110 inch, and the spacing between the grooves is 0.140 inch. However, the dimensions of each respective circumferential groove may be different to achieve desired sealing results. In the embodiment shown in FIG. 5B, the diameters of the circumferential grooves 104a, 104b, and 104c are staggered so that the diameter of groove 104a is smaller than the diameter of groove 104b, which is smaller than the diameter of groove 104c. When the seals 108a, 108b, and 108c are seated in their corresponding grooves 104a, 104b, and 104c, as shown in FIG. 5A, the outer diameters of the seals 108a, 108b, and 108c are also staggered from each other such that a line tangent to each seal is angled at a sealing taper angle φ with respect to a vertical axis A-A through the center of the valve 100. This sealing taper may improve the sealing and retention of the valve 102 in the drain tube 1. In another embodiment, the grooves 104a, 104b, and 104c (FIG. 5B) and seals 108a, 108b, and 108c are not staggered, and may instead by aligned along axis A-A and have the same diameter.

Turning to FIG. 6B, the body 102 has an inner annular wall 102c that defines the bore 110 that extends axially along axis A-A from an upper end 112 to a lower end 114 of the body 102. The bore 110 may be coaxial with the upper and lower portions 102a and 102b of the body 102. As shown in FIG. 6A, a buoyant ball 116 is located in the bore 110. The bore 110 has a diameter that is generally of constant dimension along axis A-A, with the exception of a cylindrical groove 110a located between the upper and lower ends 112, 114 of the body 102. The ball 116 has a diameter that is smaller than the diameter of the bore 110 so that the ball 116 may move freely in the bore 110. The cylindrical groove 110a is configured to receive an o-ring seal 118 (FIG. 6A) having an inner diameter that is smaller than the diameter of the bore 110 and smaller than the diameter of the ball 116, which is located below the seal 118 in the bore 110. Thus, the o-ring 118 intrudes into the bore 110 to block the upward passage of the ball 116 through the bore 110. Specifically, the o-ring seal 118 is configured to seal against the ball 116 in one configuration, further details of which are described herein.

A retaining member 120 extends diametrically across the bore 110 below the ball 112. In an embodiment, the retaining member 120 may be a pin or rod-like member assembled with the body 102 or integrally formed therewith. The retaining member can alternatively be another o-ring or reduced diameter lip positioned at the lower end 114 of the bore 110. The retaining member 120 is fixed with respect to the inner wall 102c of the body 102. When the o-ring seal 118 is located in the cylindrical groove 110a and the retaining member is present, the ball 116 is captured within the bore 110 so that the ball 116 has a range of motion between the o-ring seal 118 and the retaining member 120.

Figure 1B:
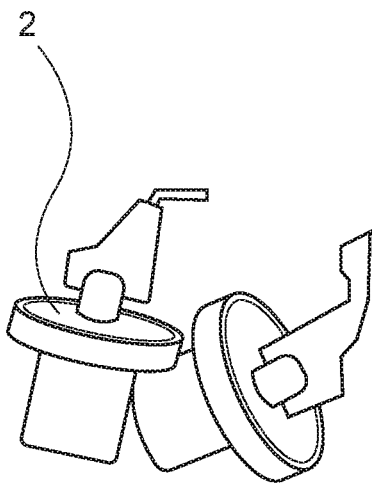
FIG. 1B shows a prior art bailer plug.
Figure 1C:
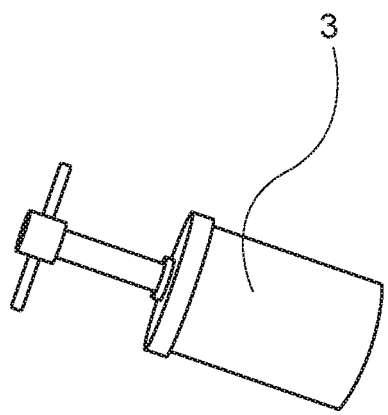
FIG. 1C shows another prior art bailer plug.
Figure 2:
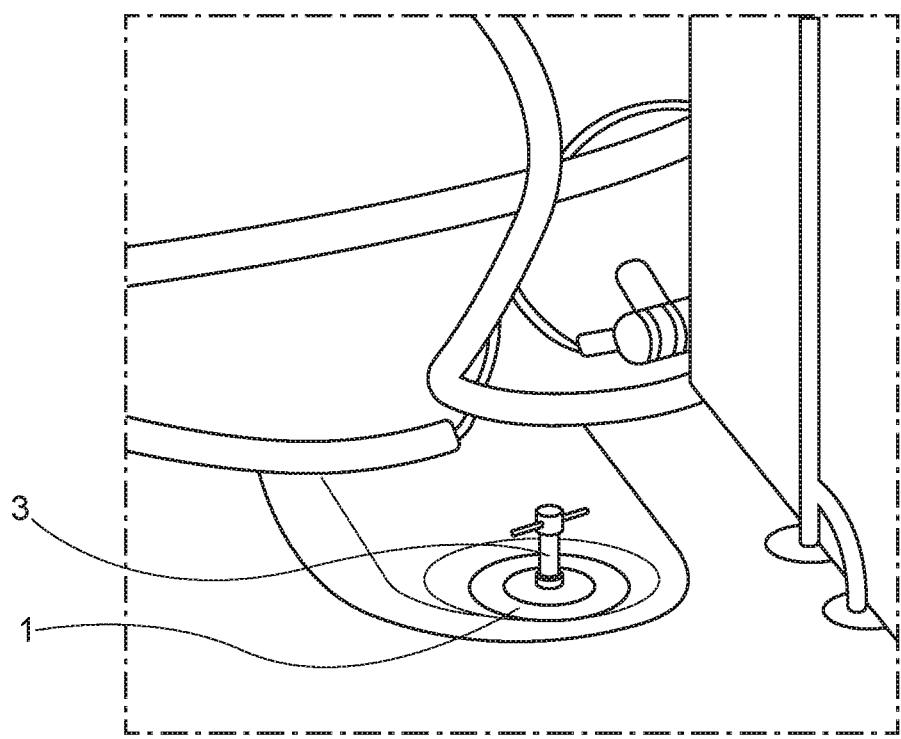
FIG. 2 shows a portion of an interior compartment of a boat partially filled with water and the drain plug of FIG. 1C sealed in a drain tube.
Figure 3:
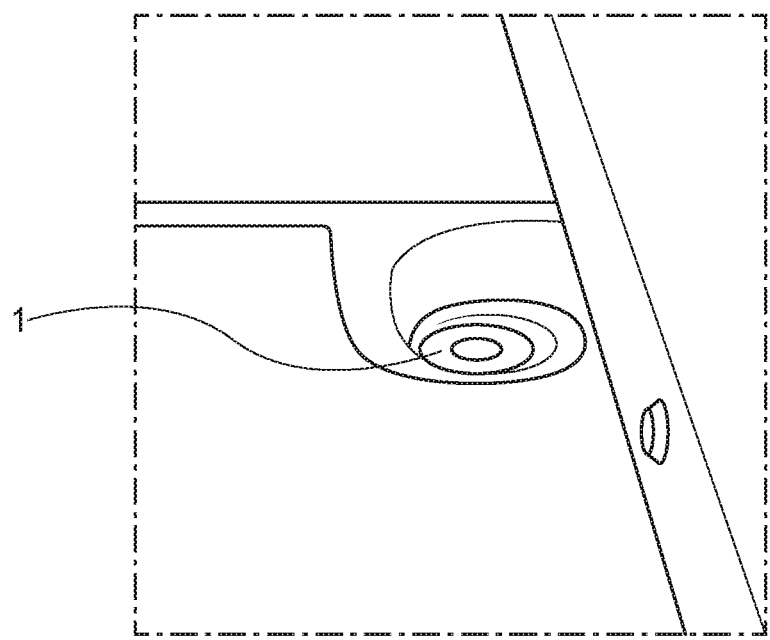
FIG. 3 shows the portion of the interior compartment of the boat of FIG. 2 with the drain plug removed.

The valve 100 may be used as follows for a boat configured with the drain tube 1. When a boat in which the drain tube is installed is out of the water, any existing bailer plug (e.g., plug 2 or 3, FIGS. 1B, 1C) is removed from the drain tube as shown in FIG. 3. The valve 100 is oriented so that the lower end 114 is oriented down and the upper end 112 is oriented above the lower end 114 so that the lower end 102b is facing the drain tube 1. The lower portion 102b of the valve 100 is introduced into the drain tube 1 and pushed until it is firmly in place or until the underside of the flange of the upper portion 102a contacts the flange 1a of the drain tube 1. When so placed, the valve 100 is in a fully seated configuration in the drain tube 1.

In the fully seated configuration of the valve 100, the upper end 112 of the bore 110 is in fluid communication with the interior compartment of the boat and the lower end 114 of the bore 110 is in fluid communication with the exterior of the boat. The interior compartment and the exterior of the boat may come into fluid communication through the bore 110 of the body 102 of the valve 100 when the valve 100 is in an open configuration, as shown in FIGS. 5A to 6B.

The ball 116 is configured to be axially displaceable in response to varying buoyancy forces applied to the ball 116 resulting from the net differential pressure applied to the ball 116 from water above and below the ball in the bore 110, if any. The buoyancy forces can change as a result of water level changes in the bore 110 during operation of the boat. For example, when the boat is on a trailer and out of the body of water in which it may be used, there will be no buoyancy forces acting on the ball 116 and the weight of the ball (as well as the downward force from any water in the interior compartment of the boat acting on the ball 116) will urge the ball 116 downward into contact with the retaining member 120, as shown in FIGS. 5A to 6B, which shows the valve 100 in an open configuration. When in the open configuration, any water above the valve can flow down the bore 110 from the interior compartment to the outside of the boat. When the boat is returned to the water after the water from the interior compartment is drained, such as when a user launches the boat from a trailer into the water, the only downward force on the ball 116 is its weight. Eventually, the water level in the drain tube and in the bore 110 rises causing the buoyant ball 116 eventually to float and rise towards the o-ring seal 118. If the water level rises sufficiently, the ball 116 engages the o-ring seal 118 and the buoyant forces acting on the ball from the water pressure below the ball 116 causes the ball 116 to seal with the o-ring seal 118, configuring the valve 100 in a closed configuration that prevents fluid flow from the outside of the boat into the interior compartment (and vice versa). Accordingly, in the closed configuration, the valve 100 is checked in a direction from the exterior of the boat to the interior of the boat.

The body 102 of the valve 100 may be made from various materials. In one embodiment, the body 100 is made from rubber and may be molded. The retaining member 120 may also be made from rubber and may be integrally molded with the rubber body 102. In one embodiment, the body 102 may be made from plastic and may be molded. Such plastics may include PVC, and PVDF, and the retaining member 120 may be integrally formed with the body out of plastic or may be made of metal and formed as a separate pin and assembled to the plastic body. The seals 108a, 108b, and 108c may be formed of various elastic materials, such as butadiene rubber, butyl rubber, chlorosulfonated polyethylene, epichlorohydrin rubber, ethylene propylene diene monomer, ethylene propylene rubber, fluoroelastomer, nitrile rubber, silicone rubber, perfluoroelastomer, polyacrylate rubber, neoprene, polyisoprene, polysulfide rubber, polytetrafluoroethylene, sanifluor, and styrene-butadiene rubber.

To facilitate installation and removal of the valve from the drain tube, a handle 124, shown in FIG. 5C, may be coupled to the upper portion 102a by holes 122 formed therein. The handle 124 may be a curved piece of metal or plastic and may be rotatable about holes 122 so that it can fold flush with the upper portion 102a (e.g., perpendicular to the position shown in FIG. 5C).

There have been described and illustrated herein several embodiments of a valve and a method of using the valve. While particular embodiments have been described, it is not intended that the invention be limited thereto, as it is intended that the invention be as broad in scope as the art will allow and that the specification be read likewise. Thus, while particular materials have been disclosed, it will be appreciated that other materials may be used as well. In addition, while particular dimensions have been disclosed, it will be understood that other dimensions can be used as required by the application. Moreover, while particular sealing configurations have been disclosed in reference to the lower portion of the valve, it will be appreciated that other sealing configurations could be used as well. It will therefore be appreciated by those skilled in the art that yet other modifications could be made to the provided invention without deviating from its spirit and scope as claimed.

What is claimed is:

1. A marine drain valve for use with a marine drain tube that extends through a wall of a marine vessel, the valve comprising:
    a body extending along a central axis, the body having a cylindrical outer surface and having a cylindrical inner surface defining a bore extending longitudinally through the body from a first end of the body configured to be positioned in an interior compartment of the vessel to a second end of the body configured to be positioned in the drain tube, the body having a length that is less than a length of the drain tube, the elongated body configured for placement partly within the drain tube;
    at least one external seal extending from the cylindrical outer surface of the body;
    at least one internal seal extending from the inner cylindrical surface into the bore;
    a retaining member extending at least partially into the bore, the retaining member being spaced longitudinally from the at least one internal seal; and
    a buoyant sealing member disposed between the at least one internal seal and the retaining member, the sealing member being longitudinally displaceable in the bore between the at least one internal seal and the retaining member and configured to seal with the at least one internal seal in a valve closed, first configuration and is configured to not seal with the at least one internal seal in a valve open, second configuration,
    wherein the outer cylindrical surface defines a plurality of circumferential grooves spaced longitudinally from each other, each circumferential groove having an inner diameter different from each other, wherein the inner diameters increase in the axial direction from the second end to the first end, and
    wherein the at least one external seal includes an o-ring that is seated in a corresponding circumferential groove.

2. The valve according to claim 1, wherein the inner cylindrical surface defines at least one circumferential groove and the at least one internal seal includes an o-ring that is seated in a corresponding circumferential groove.

3. The valve according to claim 1, wherein the at least one external seal includes a plurality of o-rings, each o-ring seated in a corresponding one of the plurality of circumferential grooves, and wherein the outer diameters of the o-rings seated in the corresponding circumferential grooves increase in the axial direction from the second end to the first end.

4. The valve according to claim 1, wherein the retaining member extends diametrically across the bore.

5. The valve according to claim 1, wherein the sealing member is a ball.

6. The valve according to claim 1, wherein the sealing member is retained in the bore between the at least one internal seal and the retaining member.

7. The valve according to claim 1, wherein the body has an upper portion and a lower portion, the upper portion formed as a flange having an outer diameter larger than an outer diameter of the lower portion.

8. The valve according to claim 7, further comprising:
    a handle coupled to the upper portion of the body.

9. A method of installing a marine drain valve in a marine drain tube that extends through a wall of a marine vessel, the method comprising:
    providing a valve comprising:
        a body extending along a central axis, the body having a cylindrical outer surface and having a cylindrical inner surface defining a bore extending longitudinally through the body from a first end of the body configured to be positioned in an interior compartment of the vessel to a second end of the body configured to be positioned in the drain tube, the body having a length that is less than a length of the drain tube, the elongated body configured for placement partly within the drain tube;
        at least one external seal extending from the cylindrical outer surface of the body;
        at least one internal seal extending from the inner cylindrical surface into the bore;
        a retaining member extending at least partially into the bore, the retaining member being spaced longitudinally from the at least one internal seal; and
        a buoyant sealing member disposed between the at least one internal seal and the retaining member, the sealing member being longitudinally displaceable in the bore between the at least one internal seal and the retaining member and configured to seal with the at least one internal seal in a valve closed, first configuration and is configured to not seal with the at least one internal seal in a valve open, second configuration; and
    introducing the second end of the body of the valve into the drain pipe and sealing the at least one external seal with the drain pipe and positioning the first end of the body in an interior compartment of the vessel,
    wherein the outer cylindrical surface defines a plurality of circumferential grooves spaced longitudinally from each other, each circumferential groove having an inner diameter different from each other, wherein the inner diameters increase in the axial direction from the second end to the first end, and
    wherein the at least one external seal includes an o-ring that is seated in a corresponding circumferential groove.

10. The method according to claim 9, wherein the inner cylindrical surface defines at least one circumferential groove and the at least one internal seal includes an o-ring that is seated in a corresponding circumferential groove.

11. The method according to claim 9, wherein the at least one external seal includes a plurality of o-rings, each o-ring seated in a corresponding one of the plurality of circumferential grooves, and wherein the outer diameters of the o-rings seated in the corresponding circumferential grooves increase in the axial direction from the second end to the first end.

12. The method according to claim 9, wherein the retaining member is a buoyant member.

13. The method according to claim 12, wherein the retaining member is a ball.

14. The valve according to claim 9, wherein the sealing member is retained in the bore between the at least one internal seal and the retaining member.

15. The method according to claim 9, wherein the body has an upper portion and a lower portion, the upper portion formed as a flange having an outer diameter larger than an outer diameter of the lower portion.

16. The method according to claim 15, further comprising:
a handle coupled to the upper portion of the body.

* * * * *